July 5, 1960

A. H. HABERSTUMP 2,943,764

ARTICLE ARRANGING AND COLLECTING DEVICE

Filed Dec. 15, 1952

INVENTOR.
Alfred H. Haberstump.
BY
Harness, Dickey & Pierce
ATTORNEYS.

July 5, 1960 A. H. HABERSTUMP 2,943,764
ARTICLE ARRANGING AND COLLECTING DEVICE
Filed Dec. 15, 1952 4 Sheets-Sheet 2
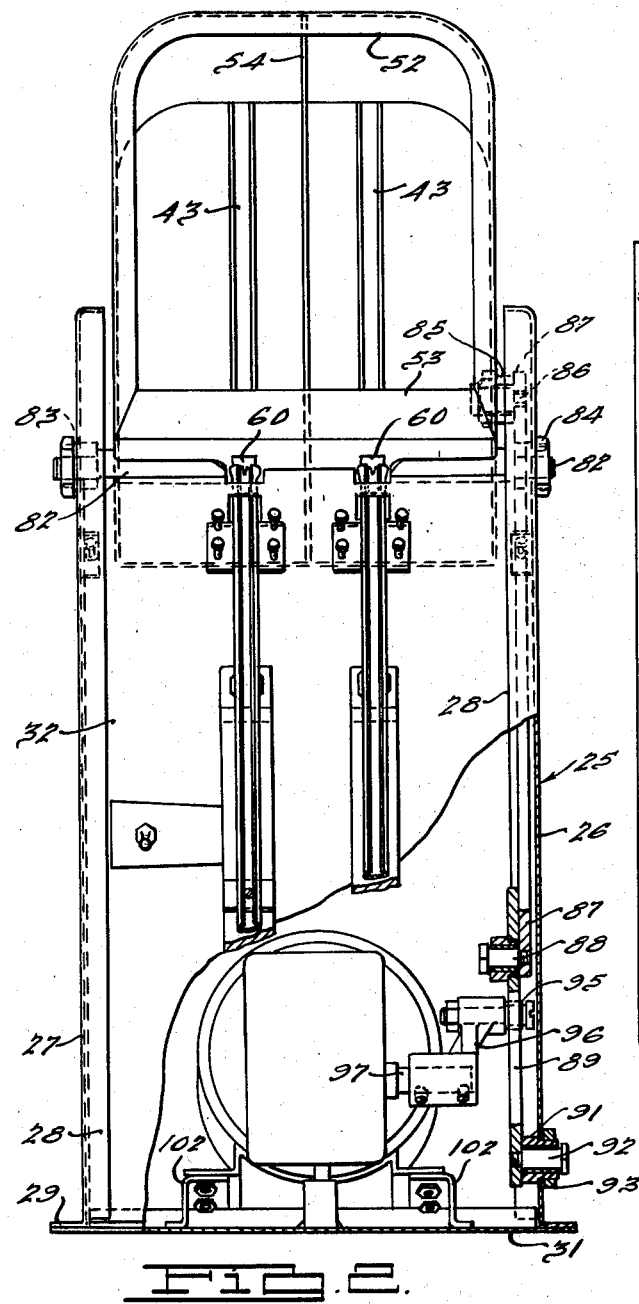
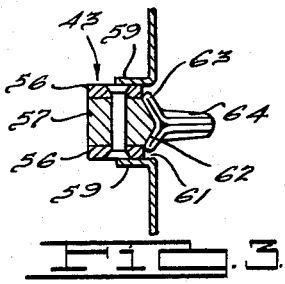
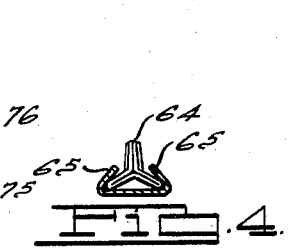
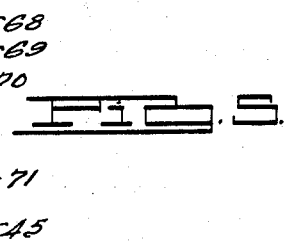
INVENTOR.
Alfred H. Haberstump.
BY
Harness, Dickey & Pierce
ATTORNEYS.

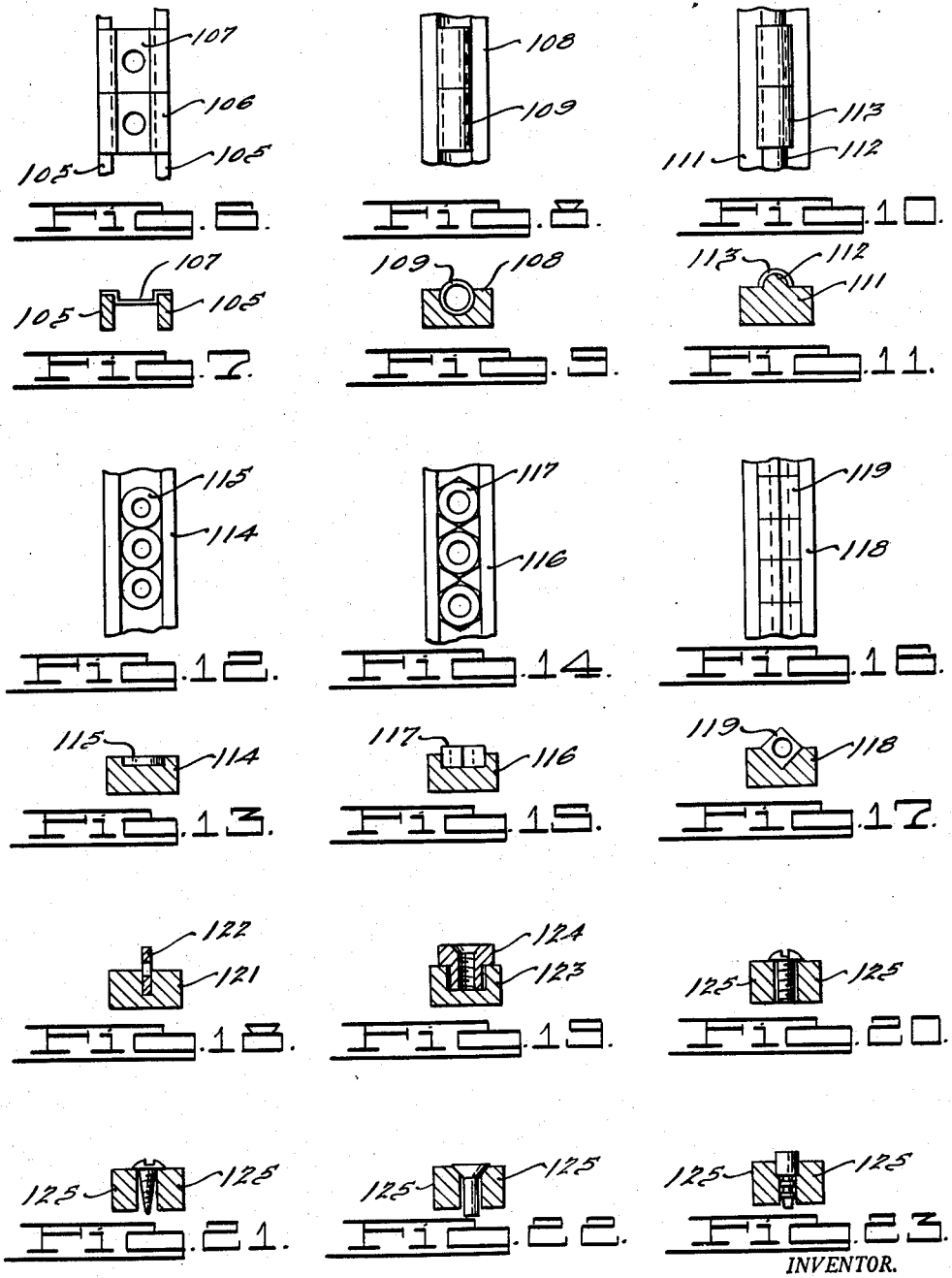

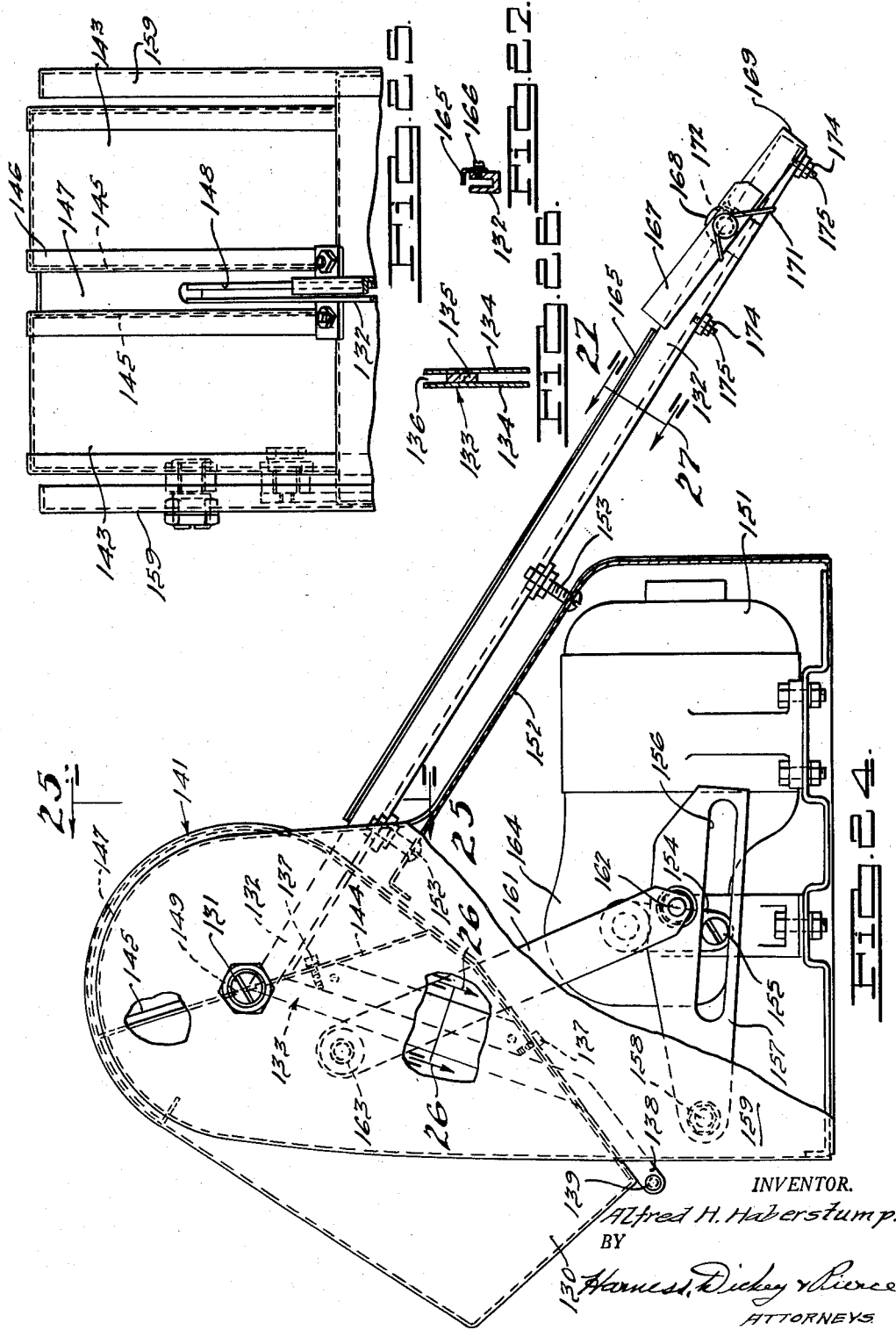

United States Patent Office 2,943,764
Patented July 5, 1960

2,943,764

ARTICLE ARRANGING AND COLLECTING DEVICE

Alfred H. Haberstump, Detroit, Mich., assignor to Haberstump-Harris, Inc., Detroit, Mich., a corporation of Michigan Filed Dec. 15, 1952, Ser. No. 325,943

13 Claims. (Cl. 221—68)

This invention relates to article arranging and collecting devices, and particularly to a device for arranging and collecting articles in predetermined relation to each other.

A pivoted hopper is provided for receiving the articles to be collected, mounted on a standard and rocked by suitable means to agitate the articles over a formed track on which they arrange themselves in a desired position. After the articles are arranged in this manner on the track, they are delivered therefrom and collected in a chute where they are maintained in the predetermined arranged relation. The articles may be rivets, nuts, washers, screws, clips and the like, and the track is so formed as to retain the article thereon when in predetermined relation thereto, conforming to the shape of the track within the hopper during the oscillation thereof.

The driving means for the hopper is so constructed as to provide a fast return from raised position, to toss the articles to the rear bottom portion of the hopper about the lower track portion so that they may properly arrange themselves thereon and be delivered therefrom when the hopper is more slowly moved to raised position. The collecting chute into which the articles are delivered from the hopper may be provided with a measuring device which permits a predetermined number of the articles to slide therefrom into a receiving magazine without interfering with the operation of the hopper.

Accordingly, the main objects of the invention are: to provide an article arranging and collecting device in the form of a hopper which is swung through an angle of substantially 90° from an article arranging position to an article delivering position; to provide a mechanism for swinging the hopper from arranging to delivering position, so constructed as to have the return portion of the hopper movement occur at a faster speed than the movement to delivery position; to provide one or a plurality of article receiving tracks within the hopper which retain the articles thereon when properly presented thereto and from which they slide into a collecting chute when the hopper is moved to raised position; to provide a collecting chute disposed in alignment with the arranging track within the hopper when the hopper is in raised position so that the articles arranged on the track may slide therefrom into the chute each time the hopper is raised; to provide an adjustable releasing mechanism on the chute which permits the delivery of a predetermined number of articles therefrom while retaining the remainder within the chute; and, in general, to provide an article arranging device in combination with a collecting chute, which is simple in construction, positive in operation, and economical of manufacture.

Other objects and features of novelty of the invention will be either specifically pointed out or will become apparent when referring, for a better understanding of the invention, to the following description taken in conjunction with the accompanying drawings, wherein:

Fig. 2 is a front view of the device illustrated in Fig. 1, with parts broken away and parts in section;

Fig. 3 is an enlarged sectional view of the structure illustrated in Fig. 1, taken on the line 3—3 thereof;

Fig. 4 is an enlarged sectional view of the structure illustrated in Fig. 1, taken on the line 4—4 thereof;

Fig. 5 is an enlarged plan view of the structure illustrated in Fig. 1, as viewed from the line 5—5 thereof;

Figure 1:
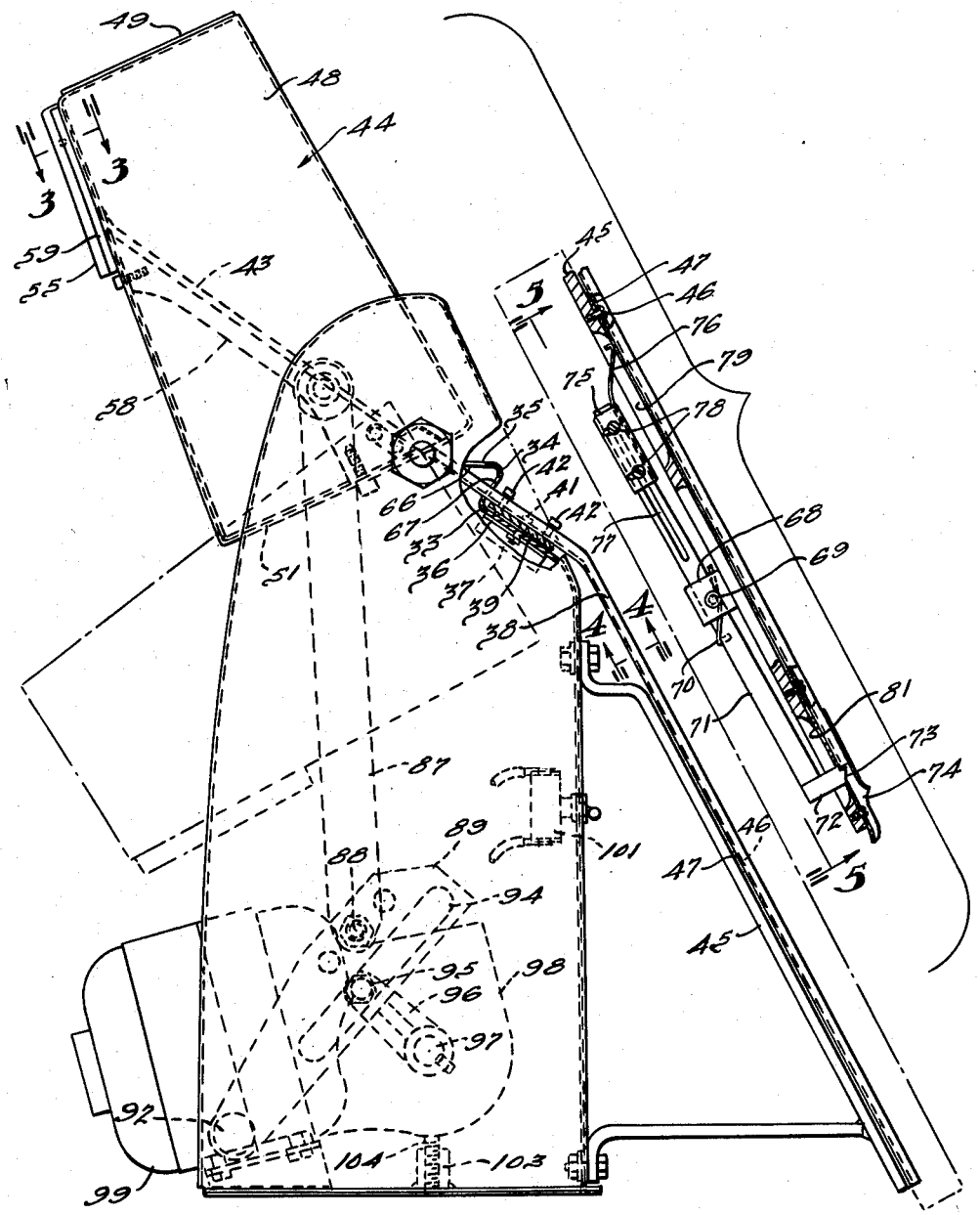
Figure 1 is a view in side elevation, with parts broken away and in section, illustrating the article sorting device of the present invention.

Figs. 6 and 7, 8 and 9, 10 and 11, 12 and 13, 14 and 15, and 16 and 17, are plan and sectional views, respectively, similar to those illustrated in Figs. 3 and 4, showing further application of the invention;

Figs. 18, 19, 20, 21, 22 and 23 are views similar to that of Fig. 4, illustrating other forms of structure useable with the device of the present invention;

Fig. 24 is a view of structure similar to that illustrated in Fig. 1 showing another form of the invention.

Fig. 25 is a broken, sectional view of the structure illustrated in Fig. 24, taken on the line 25—25 thereof;

Fig. 26 is a broken, sectional view of the structure illustrated in Fig. 24 taken on the line 26—26 thereof; and Fig. 27 is a sectional view of the structure illustrated in Fig. 24, taken on the line 27—27 thereof.

Referring to Figs. 1 to 5, the article arranging and collecting device comprises a standard 25 made up of two side plates 26 and 27 having inwardly directed flanges 28 at the sides and an outwardly directed flange 29 at the bottom. The bottom flanges 29 mate with and are secured to a bottom plate 31 forming the base of the device. A front panel 32 is secured to the side plates 26 and 27 at the point of engagement with the flanges 28. The upper portion of the panel 32 is extended inwardly at 33, flanged outwardly at 34 and inwardly at 35 and secured to a transverse plate 36 having side flanges 37 which are secured to the side panels 26 and 27 of the standard. An article collecting chute 38 has a plate 39 secured thereto by a centrally disposed bolt 41 which extends through the plate 36. A pair of adjusting screws 42 in the plate 39 permits the upper end of the chute to be adjusted upwardly and downwardly to align the end of the chute with a track 43 within a hopper 44. The front plate 32 of the standard supports a brace 45 to which the chute 38 is secured by screws 46 extending through a spacer plate 47.

The hopper 44 is of boxlike configuration, having a pair of side walls 48, and rear and forward walls 49 and 51, the latter being provided with inwardly directed flanges 52 and 53 respectively. The top flange 53 of the front wall 51 extends into the box a greater distance than the flange 52 to prevent the articles from being thrown from the hopper when the hopper is rapidly moved to down position. In the hopper herein illustrated a pair of tracks 43 is provided which may handle the same articles, or when different articles are handled a partition 54 is employed therebetween for preventing the intermingling of the different articles within the hopper. Similarly, it is to be understood that the device may be of any width and provided with any number of the tracks 43 for handling the same article, or divided by one or more partitions so that different articles may be handled by the single device.

The track 43 extends from the forward wall 51 to the rear wall 49 and projects downwardly through the bottom of the hopper at 55. As illustrated in Fig. 3, metal plates 56 are riveted to the track element 57, which is cut away at 58, as illustrated in Fig. 1, and retained between the plates 56 which extend to the bottom of the hopper to close the area therebeneath. The bottom of the hopper is flanged downwardly at 59 on each side of the track member to form a depressed area 61 at each side of the top edge of the track 57. The top edge of the track has angularly disposed surfaces 62 on which the angularly disposed flanges 63 of the article 64 mate when properly engaged therewith. As the hopper oscillates, the articles 64 are constantly thrown toward the bottom portion of the track element 43 and a number thereof will properly engage the sloping surfaces 62 and will move therealong toward the forward wall 51 when the hopper is raised. The forward end of the track member is aligned with the collecting chute 38 when the hopper is in raised position, and the article 64 will slide from the track 43 into the collecting chute 38. The chute has inwardly directed side flanges 65 and receives and retains the articles 64 in desired collected relation. It will be noted that the flange portions 34 and 35 of the front panel are provided with apertures 66 and 67 through which the end of the delivery tube extends.

The front panel 51 has an aperture 60 at the end of the track 43 which permits the articles 64 to pass from the hopper only when properly engaging the track.

The portion of the collecting chute 38 below the supporting bracket 45 has a pair of flanges 68 welded or otherwise secured thereon for supporting a pivot 69 to which a tiltable bar 71 is pivoted. The forward end of the bar has a finger 72 provided with a cam end 73 which is engageable by a receiving magazine insertable in the open lip 74 at the end of the collecting chute 38. Such engagement deflects the finger 72 and tilts the bar 71 to permit a number of the articles 64 to slide from the chute 38 into the receiving magazine. The upper end of the bar 71 carries an adjustable collar 75 having a finger 76 projecting therefrom which moves inwardly of the chute 38 for holding the articles 64 from moving down into the lower portion of the chute as a predetermined number thereof pass into the magazine. The collar 75 is adjustably secured on the bar 71 by bolts 78 extending through a slot 77 therein. It is to be understood that the lower portion of the supporting bracket 45 has slots 79 and 81 therein through which the fingers 72 and 76 project.

The hopper has a pair of stub shafts 82 provided on the front wall 51, the center of which falls upon the point of intersection of the track and chute. The shafts 82 extend within bushings 83 in the side panels 26 and 27 of the supporting standard 25, the bushings being secured in position by the nuts 84 which are threaded thereon. A similar bushing 85 is secured to the wall of the hopper by a nut for rotatably supporting a stub shaft 86 to which the end of a link 87 is secured. The opposite end of the link is secured to a stub shaft 88 which is pivoted in a bushing secured to a lever 89. The lever 89 is secured to a stud 92 which is pivoted in a bushing 91 that is secured to the lower portion of the panel 26 by a nut 93. The lever 89 has a slot 94 therein in which a roller 95 on the end of a crank arm 96 extends. The driven end of the crank arm is secured to a shaft 97 of a speed reducer 98 which is driven by a motor 99. By using the lever 89, a smaller amount of the arcuate movement of the arm 96 is effective for returning the hopper to its "down" position, while the greater amount is utilized for moving the hopper to its "raised" position. By this arrangement, a greater agitation of the articles 46 occurs within the hopper when the hopper is rapidly moved to "down" position and less agitation occurs thereto when the hopper is moved more slowly to "raised" position for delivering the articles 64 disposed upon the track.

A switch 101 is secured to the front panel 32 to which the circuit to the motor 99 is connected. Brackets 102 are provided on the bottom plate 31 of the standard for angularly positioning the motor 99, as illustrated in Fig. 1. A threaded bushing 103 is provided centrally of the plate in which a stud 104 is adjustable for supporting the speed reducing portion of the drive which may be shifted to control the delivering position of the hopper when in fully raised position. When operating the device, the articles 46 are placed within the hopper 44 when the hopper is in "down" position, over the track or tracks 43 provided therein. When the hopper is moved from "down" to "raised" position, the articles move forwardly to the front bottom corner of the hopper, leaving those which have properly engaged the sloping surfaces 62 of the track 43 to slide therealong and into the collecting chute 38. When the hopper is quickly moved to "down" position, the articles are tossed to the rear bottom corner of the hopper over the track portion thereat where certain ones of the articles will properly engage the track and will slide therealong when the hopper is moved to "raised" position. This constant agitation of the articles from the forward to the rear wall of the hopper causes a number of the articles to properly engage the track 43, and a substantial number thereof will be advanced therealong into the chute 38. In this manner, the chute 38 is always filled with the articles which may be removed therefrom into a receiving magazine or otherwise collected, as pointed out above. While two tracks 43 are illustrated in the embodiment of the invention herein shown, these may be employed without a partition 54 so that the more rapid delivery of one particular type of article may occur, or when a partition is employed separating the tracks, then two different types of articles may be delivered by the device.

It is to be understood that different types of track are employed with each different type of article which is to be delivered by the device. Several examples of such tracks and collecting chutes are illustrated in the various additional figures of the drawings. In Figs. 6 and 7, a pair of spaced bearings 105 is illustrated for receiving a cage 106 for a nut. The offset central portion 107 of these cage elements will extend between the two bars and be retained thereby while permitting the delivery thereof only in the position illustrated. In Figs. 8 and 9 a semicircular channel element 108 is illustrated for receiving short tubular workpieces 109 which mate with channel portion and slide therealong. In Figs. 10 and 11 a bar 111 is illustrated having a projecting semicircular portion 112 which receives the semicircular elements 113 which are guided laong the semicircular portion 112. In Figs. 12 and 13, a channel-shaped bar 114 is illustrated for receiving and delivering washers 115. Similarly, in Figs. 14 and 15 a channel-shaped bar 116 is employed for receiving and delivering hexagonal nuts 117. In Figs. 16 and 17, a channel-shaped bar 118 is illustrated for receiving and delivering short bars 119. In all of these arrangements, the articles will contact the arranging track or bar in a proper manner, and will slide therealong and be delivered from the hopper.

A further form of track is illustrated in Fig. 18, wherein the bar 121 has a slot therein to receive a washer 122 when disposed in vertical position. In Fig. 19, a channel-shaped bar 123 is illustrated for receiving a shouldered nut 124. In Figs. 20, 21, 22 and 23, spaced bars 125 are illustrated for receiving and delivering screws, bolts, rivets and the like, with the heads thereof resting on the top of the bars.

From the various track arrangements, it is evident that the hopper is in no way limited in application for properly selecting and delivering articles to be collected. The collecting chute is of substantial length so that a large number of the articles will be retained thereby and be available when several magazines are to be filled, one after the other. The rapid return of the hopper to its lowermost position produces the desired agitation of the articles so that a substantial number will always mate with the track in position to be delivered therealong when the hopper is moved to raised position. When the collecting chute is full, none of the articles will pass from the hopper to the chute but will be retained on the track when the hopper is moved to lowered position, in position for delivery after the articles in the chute are removed therefrom.

Referring to Figs. 24 to 27 inclusive, a further form of the invention is illustrated which may be employed for the articles heretofore illustrated, and primarily for rivets, screws, and other types of headed elements having relatively long shanks. A hopper 130 has a pivot 131, the center of which is exactly located on the top intersecting edges of the collecting chute 132 and the arranging track 133 so that the track can move in exactly aligned relation to the chute when the hopper is raised to delivery position in the same manner as the hopper 44 illustrated in Fig. 1. The track 133, as illustrated in Fig. 26, is made of two side plates 134 spaced by a supporting bar 135 providing a channel or recessed portion 136 in which the shanks of the workpieces extend when the plates 134 support the heads thereof. A pair of screws 137 secures the track within the hopper, with the lower portion 138 extending therefrom. The ends of the lower portion are spaced apart by a washer of suitable thickness and clamped together by a rivet 139.

The forward end 141 of the hopper is of arcuate shape and enclosed by a pair of spaced arcuate plates 143. Forwardly of a central partition element 144, a pair of side plates 145 is provided, the forward arcuate edges of which are enclosed by the offset arcuate flanged plate 146. In this manner, two forward pockets are provided enclosed by the plates 143 on each side of the spaced side plates 145, the area 147 between the side plates 145 being cut off from the admission of articles thereto. Within the area 147, the collecting chute 132 extends through a slot 148 in the arcuate flanged plate 146. The partition 144 adjacent to the axis of the pivot 131 has an aperture 149 therein which limits the passage of any of the articles from the track 133 into the chute 132 only when disposed in the desired manner upon the track.

The weight of the hopper forwardly of the pivot 131 along with that of the articles therein tends to balance the hopper portion rearwardly of the pivot 131. The weight of the entire device in like manner is balanced by the forward position of the motor 151 beneath the wall 152 to which the chute 132 is adjustably mounted on studs 153. The motor operates a crank 154 having a roller 155 operating in a slot 156 within a lever 157. The lever 157 is secured by a pivot 158 to the standard 159 and a link 161 is secured by a pivot 162 to the lever 157 and by a pivot 163 to the wall of the hopper. The arm 154 is driven from a speed reducer 164 mounted on the forward end of the motor. The arrangement of the arm, lever and link is such as to produce a rapid return of the hopper to down position, as illustrated in Fig. 24, and a much slower movement thereof to raised or delivery position. The rapid down movement produces the tossing and a greater agitation of the articles within the hopper so that they will more readily align themselves in a desired manner within the lower track portion 138 so as to be delivered along the track into the chute when the hopper is in raised position.

The chute 132 is a channel-shaped element, as illustrated more clearly in Fig. 27, having an angle-shaped guard 165 secured on one side thereof by screws 166. The guard prevents the heads of the articles, such as rivets, screws and the like, from falling from the chute as they advance therealong. A delivery control link 167 is pivoted to a bracket 168 secured on one side of the chute. The link 167 has an end 169 which strikes against a stud 175 at the lower end of the chute, biased in a clockwise direction thereagainst by a spring 171, as illustrated in Fig. 24. A finger 172 is mounted upon the member 167, employed for the purpose of extending downward within the chute between the heads of the articles for preventing the articles from passing from the end of the chute. When the member 167 is moved in a counterclockwise direction from the position illustrated in the figure, limited by the stud 175 at the opposite end of the link, the articles may pass from the chute. This movement may be accomplished by hand, by a solenoid or other means when a number of the articles are to be delivered from the chute. Nuts 174 on the studs 175 lock the studs in position after adjustment.

It is to be understood that the various pivots 131, 158, 162 and 163 are similar to those above described with regard to the structure illustrated in Fig. 1, embodying a bushing extending through the sheet metal and clamped thereon by a nut. The operation of the device illustrated in Figs. 24 to 27 is the same as that of Fig. 1, the rapid return of the hopper causing the agitation of the articles therein, producing the arrangement thereof within the track 133 and which are delivered, when properly arranged, through the aperture 149 in the partition 144 to the collecting chute 132 when the hopper is in raised position and the track 133 is aligned with the collecting chute 132. This accurate alignment is obtained through the adjustment of the chute on the studs 153.

What is claimed is:

1. An article arranging and delivering device including, in combination, a standard, a hopper having rear and side walls and a substantially semicylindrical front wall, pivot means disposed substantially on the center from which the semicylindrical front wall was struck for supporting the hopper on the standard, a U-shaped element in said front wall, forming an outwardly presenting slot and pockets each side thereof in the front portion of the hopper, means for oscillating said hopper between raised and lowered positions, and a pair of article collecting tracks one within the hopper the other having one end within the slot, the adjacent ends of said tracks being disposed in article delivering and receiving relationship when said hopper is in raised position.

2. An article arranging and delivering device including, in combination, a hopper having bottom, rear, side and front walls, pivot means on the side walls located above and rearwardly of the front lower portion of the hopper to have the front lower portion disposed forwardly and below said pivot means, a track in said hopper having one end disposed in substantial alignment with said pivot means, said hopper having an outwardly presenting recess extending into the hopper from the front wall thereof, and a second track element disposed in said recess having one end extending into the recess and hopper to be located adjacent to the end of the track within the hopper in alignment with said pivot means above and rearwardly of the forward lower bottom portion of said hopper.

3. An article arranging and delivering device including, in combination, a hopper having bottom, rear, front and side walls, pivot means on the side walls located above said bottom and rearwardly of said front wall, an outwardly presenting vertical recess extending rearwardly into said hopper from the front wall thereof, and track means in said hopper having one end thereof communicating with an opening in said recess at a point substantially on the axis defined by said pivot means, the width of said track means being substantially less than the width of said hopper.

4. The invention as defined in claim 3 wherein said track means comprises a pair of parallel spaced-apart plates extending upwardly from said bottom of the hopper, the upper edge of said plates being inclined so as to slope upwardly from the bottom rear portion of the hopper to said point substantially on the axis defined by said pivot means.

5. The invention as defined in claim 3 including a standard for pivotally supporting said hopper on said pivot means, and means for oscillating said hopper between a raised and a lowered position.

6. The invention as defined in claim 3 wherein said front wall of the hopper is substantially semicylindrical in shape and said pivot means is disposed substantially on the center about which the semicylindrical front wall is formed.

7. The invention as defined in claim 3 wherein said recess is formed by an outwardly presenting U-shaped element in the front wall of said hopper which divides the front portion of the hopper into two pockets.

8. The invention as defined in claim 7 wherein the corners formed between the rear and side walls are rounded to a substantial degree to cause the articles being arranged to be directed toward the center of the rear wall when the hopper is lowered.

9. The invention as defined in claim 7 wherein a plurality of said U-shaped elements are spaced along the front wall of said hopper to divide the front portion of the hopper into a plurality of pockets, and a plurality of said track means are disposed in said hopper, one aligned with each of said U-shaped elements.

10. The invention as defined in claim 9 including a partition within said hopper between each of said U-shaped elements and the track means aligned therewith to provide separate storage areas for each of said track means.

11. The invention as defined in claim 6 including a standard for pivotally supporting said hopper on said pivot means, and means for oscillating said hopper on said standard between a raised and lowered position, said means including a motor mounted on said standard for raising and lowering the hopper and positioned forwardly of said pivot means to balance the weight of the hopper.

12. The invention as defined in claim 11 wherein said standard has an arcuate end portion having substantially the same radius of curvature as said front wall and which is struck from said pivot means.

13. The invention as defined in claim 12 wherein said means for swinging said hopper on said pivot means between raised and lowered positions is disposed wholly within the dimension of said standard.

References Cited in the file of this patent

UNITED STATES PATENTS

| | | |
|---|---|---|
| 108,295 | Rogers | Oct. 11, 1870 |
| 432,477 | Casey | July 15, 1890 |
| 529,701 | Briggs | Nov. 27, 1894 |
| 1,095,193 | Curtis | May 5, 1914 |
| 1,159,195 | Eden | Nov. 2, 1915 |
| 1,167,805 | Elliott | Jan. 11, 1916 |
| 1,481,064 | Ochs | Jan. 15, 1924 |
| 1,482,427 | Boutin | Feb. 5, 1924 |
| 1,546,915 | Calkins | July 21, 1925 |
| 1,762,649 | Andrews et al. | June 10, 1930 |
| 1,812,501 | Strobel | June 30, 1931 |
| 1,839,920 | Henry | Jan. 5, 1932 |
| 2,291,484 | Mulvany | July 28, 1942 |